United States Patent

Wang

[11] Patent Number: 5,724,130
[45] Date of Patent: Mar. 3, 1998

[54] TECHNIQUE FOR THE MEASUREMENT AND CALIBRATION OF ANGULAR POSITION

[76] Inventor: Charles Wang, 28509 Seamont Dr., Palos Verdes, Calif. 90274

[21] Appl. No.: 524,653

[22] Filed: Sep. 8, 1995

[51] Int. Cl.⁶ .............................. G01C 3/00; G01B 11/26; G01D 5/34

[52] U.S. Cl. ........................... 356/152.2; 250/231.13; 250/231.14; 250/231.17; 356/4.09; 356/28

[58] Field of Search .................................. 356/28, 152.2, 356/4.09; 250/231.13, 231.14, 231.17

[56] References Cited

U.S. PATENT DOCUMENTS 5,103,090   4/1992   Weiner .............................. 250/231.13
5,489,984   2/1996   Hariharan et al. ...................... 356/4.09
5,585,913   12/1996  Hariharan et al. ...................... 356/4.09

*Primary Examiner*—Stephen C. Buczinski
*Attorney, Agent, or Firm*—Gene Scott - Patent Law & Venture Group

[57] ABSTRACT

The present invention relates to apparatus and methods for the precision measurement and calibration of a body such as a precision rotary table. It consists of at least one, or preferably a polygon of mirrors placed on the body or around a circumference of the precision rotating table and an interferometer instrumentation arranged on an optical path which includes the mirrors. The rotational angle of the body or table is continuously measured with high accuracy without being affected by bearing runout. An optical means for detecting actual positions of the body using a laser and razor blade means provides for simple and easy calibration of the body's position.

9 Claims, 3 Drawing Sheets

$B_0 = R_0$ $B_0 = R_0$ 5,724,130

TECHNIQUE FOR THE MEASUREMENT AND CALIBRATION OF ANGULAR POSITION

FIELD OF THE INVENTION

This invention relates to an apparatus and a method of using the apparatus for the measurement and calibration of the rotational angle of a body. More particularly it relates to a high precision apparatus and method for measurement and calibration specifically of a polygon using a laser interferometric technique.

BACKGROUND OF THE INVENTION

High accuracy angular measurement is required in machine tools, electronic fabrication and in telescope pointing, to site a few examples from a very broad area of applicability. Conventional techniques for these kinds of measurement include laser interferometry and autocollimation. In the well acknowledged work by R. R. Baldwin, L. E. Truhe and D. C. Woodruff, entitled *Laser Optical Components for Machine Tools and other Calibration*, (Hewlett-Packard Journal, Apr. 1983, pp. 14-16) we are taught that the range of control is critically dependent upon the nature of a target used with optical techniques. To this point we find that a corner-cube target can cover a range of a few degrees of arc while a flat-mirror can only cover a range of a few minutes of arc. Similarly, we have learned from D. Malacara, in *Optical Shop Testing*, (John Wiley & Son, 1978, p. 467) that an autocollimator can only cover a range of a few minutes of arc. We know also from Gary Sommergren, in Angular Measuring Interferometer, (U.S. Pat. No. 4,717,250, issued Jan. 5, 1988), that the range is larger then for the above examples, but the optics are complex requiring a laser with two frequencies which are orthogonally polarized.

The prior art in this field further includes the well known rotary encoder whose precision is based upon angular graduations on a disk as described by Harold Bernard in Photoelectric Device for Position measurement, (U.S. Pat. No. 5,111,040, May 5, 1992), and Sandor Holly, in Process and Apparatus for Sensing Magnitude and Direction of Lateral Displacement (U.S. Pat. No. 3,930,734, Apr. 6, 1976), and David M. Brudnoy, in Dual-beam translator for use in Laser Doppler Anemometry" (U.S. Pat. No. 4,637,717, Jan. 20, 1987) the latter describing a rotatable transparent optical glass plate used in laser Doppler anemometry. Of particular interest is Bernard's patent, which describes how angular position is obtained by scanning the graduation scale. The laser beam, double pass arrangement and the retroreflector are designed for accurately reading the graduation scale without significant effect of disk wobble. In Holly's patent, a technique is described for accurately measuring a fractional distance between two substantially parallel lines or slit elements, such as an encoder might have. This could be also applied to measure rotation of a body. In Brudnoy's patent, a dual beam translator is used in laser Doppler anemometry for the purpose of measuring the Reynold's shear stress. The technique described translates a pair of light beams in a direction parallel to an original beam by rotating a pair of glass plates.

SUMMARY OF THE INVENTION

The present invention diverges significantly from the prior art. It uses the technique known as laser Doppler interferometry, e.g. Dopplometry. The basic measuring instrument and the technique are described by the present inventor and S. B. Zhou in Interferometer requiring no critical component alignment, (U.S. Pat. No. 5,116,126, May 1992). The objective in this former work is to measure angular changes of a flat target with high accuracy.

A previous application by the applicant, Ser. No. 08/043,367, filed on Apr. 6, 1993 entitled Apparatus For Measuring High Frequency Vibration, Motion, or Displacement is hereby incorporated into the present application by reference. The apparatus and technique of measurement using a single LDDM instrument is fully described and claimed in the above reference in which FIG. 3 illustrates the double pass technique used in the present application.

Basically, this form of interferometry uses an instrument identified as an LDDM interferometer, a Laser Doppler Displacement Meter. The LDDM may be used alone or in pairs to measure displacement of a target consisting of either a flat-mirror or a retroreflector, and provides high accuracy as well as high resolution. With the LDDM instruments aligned parallel to each other and perpendicular to a single flat-mirror the displacements at two locations on the mirror are measured precisely. The rotational angle of the mirror is simply the difference of the measured displacements divided by the separation of the two laser beams. It is noted that for the LDDM interferometer, the returning laser beam can be laterally displaced by a few millimeters (mm), however, it must be parallel to the output beam to within a few arcminutes, so that the maximum measurable rotational angle of the flat-mirror is limited to a few arcminutes.

To extend the range of this rotational angle, a double-pass optical arrangement with a retroreflector is used. Hence the laser beam returned to the aperture is always parallel to the output beam but laterally displaced by an amount approximately twice the distance between the flat-mirror and the laser source times the rotational angle of the flat-mirror. Assume the maximum lateral displacement is ±2 millimeters (mm), and the stand-off distance, that is, the distance between the laser source and the flat-mirror, is 25 mm; then the maximum measurable rotational angle range of the flat-mirror is ±2 mm/2×25 mm or ±2.3 degrees.

The measurement range is extended to 360 degrees by using a multitude of mirrors arranged side-by-side in a ring to form a polygon. From the foregoing we know that each of the flat-mirrors accommodates a measurement range of up to 4 degrees, so that 90 flat-mirrors provides a continuous measurability over a full circle of rotation, i.e., 360 degrees. However, during the transition from one flat-mirror to the next one, the measurement is interrupted. To solve this problem, a second pair of LDDM instruments is interfaced with the polygon of mirrors, e.g., a different flat mirror and in a location selected such that both pairs of LDDM instruments will not be at a mirror interface simultaneously. Hence alternately, there is always one sub-system maintaining the measurement while the other sub-system is transitioning a mirror interface. The measurement is incremental, that is, to determine the present angular position, the measurement must start from a zero position and continue on a continuous basis to track angular changes from the zero position. When the laser beam is interrupted, all angular position information is lost so that the procedure must be started from zero again. Because of this, it is desirable to have an absolute position marker at 45 degree increments. In this case, should a measurement interruption take place, the target need only move a distance of 22.5 degrees on average, or a maximum of 45 degrees to obtain a new zero setting.

The problems of how to generate the angular position markers and how to calibrate the absolute angular position of these markers is solved using the technique of optical shadowing. Consider; when a razor blade passes laterally through a light beam the position of the razor blade can be determined by the amount of light being blocked. To achieve higher resolution, a focused laser beam is used with the razor blade set at its focal point. Hence there is a large light intensity change for a small movement of the razor blade. The resolution of the markers is very high. Markers are initially located near the 45, 90, 135, 180, 225, 270, 315 and 360 degree angular positions, and the LDDM system is used to measure the marker positions. Although its resolution is extremely high at about 0.01 arcsec, the LDDM system has an accuracy of only approximately 1% for large angles. Therefore a self-calibration technique is used. Since we know that 1 revolution is exactly 360 degrees, ½ revolution is exactly 180 degrees and ¼ revolution is exactly 45 degrees, the absolute angular position of the markers at 45, 90, 135, 180, 225, 270, 315 and 360 degrees can be calibrated with an accuracy much higher than with the laser system. After the marker positions have been calibrated, the marker positions are used, in turn, to calibrate the laser system.

To calibrate the angle of an indexing table see Charles Reeve, *The Calibration of Indexing Tables by Subdivision*, (NBS report #NBSIR 75-750, Jul. 1975). The technique discussed in this work does not take into account bearing runout which may introduce a relatively large error.

The present invention uses the above described apparatus and method to accurately measure the angular position of a polygon, including the generation of reference position markers, and a method to self calibrate these markers at angular positions incremented at 45 degrees around a full rotation. The measurement is insensitive to the polygon bearing runout and wobble. Resolution of measurement is high, typically 0.01 arcsec and of course, the range is 360 angular degrees.

Other features and objectives of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
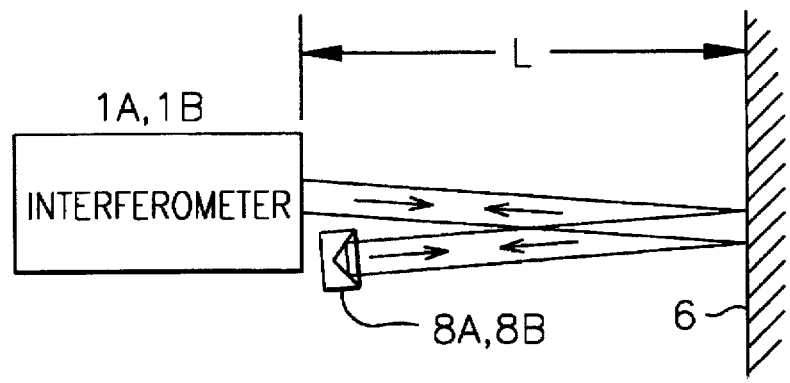
FIG. 1 is an elevational view of an LDDM instrument showing a double-pass optical arrangement for the measurement of rotational angle changes of a flat mirror.
Figure 3:
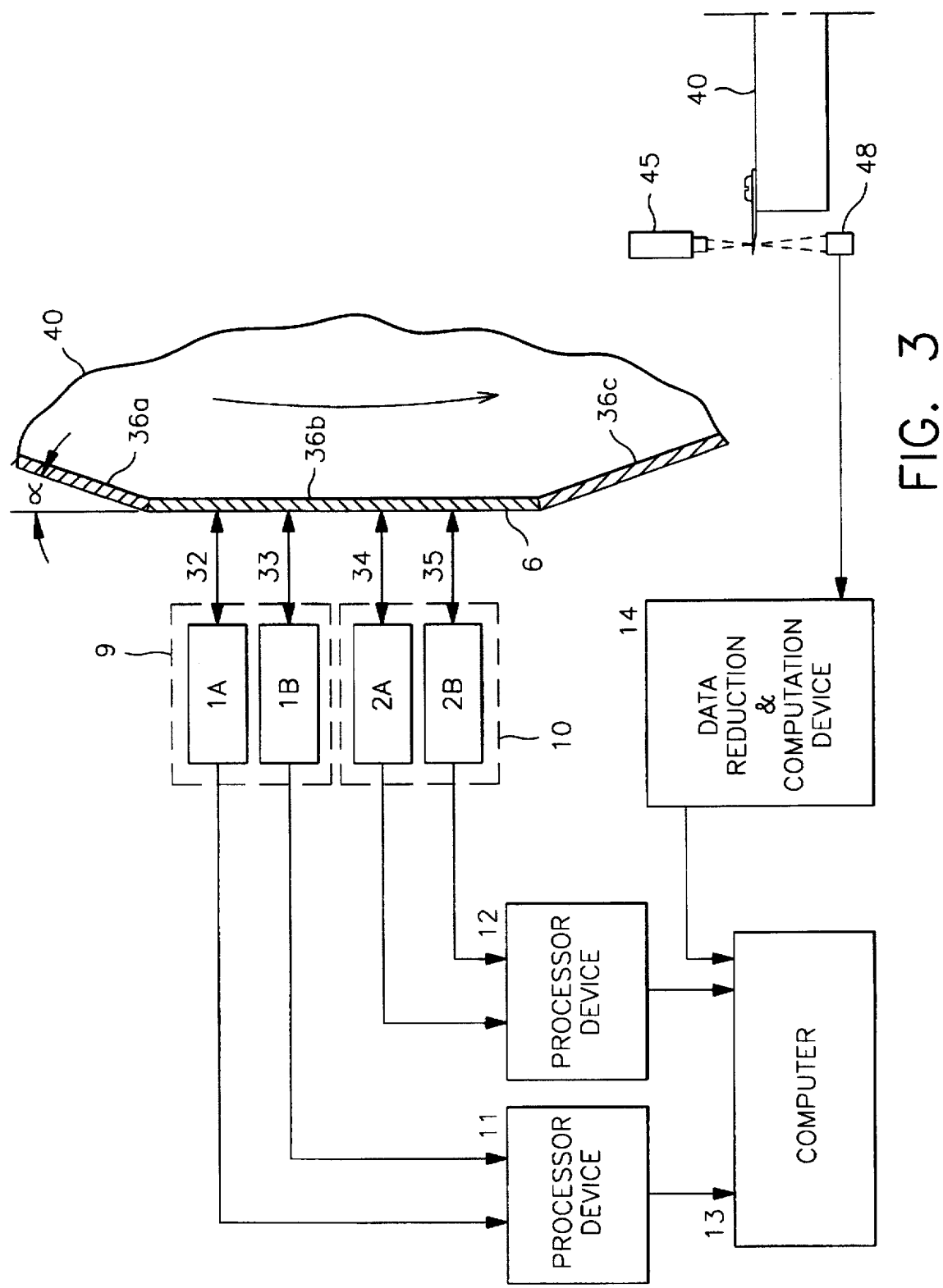
FIG. 3 is a system block diagram showing the method of using two side-by-side arrangements of the instruments of FIG. 2, i.e., four LDDM instruments, as well as the calibration method of FIG. 3.

The present invention is an optical apparatus and method for measurement of angular position change of a light reflecting means, preferably at least one reflective planar mirror target surface 6. Conceptually, the target surface 6 is mounted on the outer periphery of a rotating drum shaped table 40. It is facing outwardly, or alternately, inwardly, so that as the table rotates, the target surface 6 continually changes its angular position relative to an observer located on a radius of the table. As shown in FIG. 3, the apparatus includes a first measurement subsystem 9 having several optical elements, namely, a pair of positionally fixed interferometers 1A, 1B and, a pair of positionally fixed retroreflectors 8A, 8B, the later best seen in FIG. 1. These elements define the first measurement subsystem 9 which is capable of projecting, preferably, a pair of light beams 32A, 32B in straight parallel positions to the rotating target mirror surface 6. The beams 32A, 32B are in turn reflected from the target surface 6, to a retroreflecting means, preferably retroreflectors 8A, 8B, back to the target surface 6 again, and finally back to each one of the interferometers 1A, 1B of origin respectively. In this manner high accuracy interferometric measurements of the angular position changes of the target surface 6 are measured by the interferometers 1A, 1B. The range of measurement is extended by the use of the retroreflectors 8A, 8B since they extend the measurable total beam path.

Preferably the reflective target surface 6 comprises a plurality of identical reflective planar target surfaces 6a, 6b, 6c, and so on as shown in FIG. 3. These surfaces are preferably provided by precision mirrors 36a, 36b, 36c and so on, respectively, arranged in side-by-side abutting positions establishing a multi-sided regular closed polygon ringing the drum. Each of the target surfaces 6a, 6b, 6c, and so on, are positioned at an angle α relative to its adjacent target surfaces, so that a total of 90 mirrors establishes a full ring about the drum. Again, the target surfaces 6a, 6b, 6c, and so on, are fixed to, so as to move as an integral unit on the table, as would be the case if the target surfaces were mounted on a peripheral edge of a precision indexing table rotating on a precision central bearing. Each pair of the side-by-side abutting mirrors 36a and 36b, 36c and 36d, and so on, defines a non-reflective interface where they abut.

The apparatus further, preferably includes a second measurement subsystem 10 which is identical to the first measurement subsystem 9 described above and provides a pair of beams 34, 35 identical to beams 32, 33. The second subsystem 10 is positioned relative to the first subsystem 9, such that motion of the target surfaces 6a etc. causes these surfaces to move sequentially past both pairs of projected light beams from the two measurement subsystems. The beam pairs 32, 33 and 34, 35 are spaced apart such that when one of the pairs of the beams impinges on any one of the interfaces, the other one of the pairs of the beams does not impinge on any one of the interfaces so that positional measurement is continuous, input data being received from one or the other of the subsystems or both at any instant. The data streams from these two subsystems 9 and 10 are redundant.

In FIG. 3 we see that at that instant, the four light beams 32–35 impinge upon mirror 36b, so that identical information is processed by subsystems 9 and 10. The rate of change in the angular position of mirror 36b will be determined by both subsystems 9 and 10 and their difference should not exceed the error due to noise in the relative subsystems. As the table continues to rotate, first beam 32, and then beam 33 will move onto mirror 36a. During this transition period for subsystem 9, the data received by subsystem 10 will be processed and that from subsystem 9 ignored. The same is true, in reverse, when the beams 34, 35 move onto mirror 36a so that data from subsystem 10 will be ignored while that from subsystem 9 will be processed.

An important further elaboration of the instant invention includes a series of angular position markers, any of which may be used to establish a new zero setting or a runout error. Preferably eight position markers are used, each including a diode laser with focusing lens, and a photodetector. A means for signal and data reduction and computation 14 is used for fully automated operation. Razor blades are placed at regularly spaced positions on the table and move with the table, and each comes into a position between each diode laser and photodetector in turn. The razor blades blocks the laser beam when interposed. For each position marker, a detector output is at full-voltage, typically 5V, and after the laser beam has been blocked, the detector output is zero volts. By measuring the detector output and the corresponding blade position, a calibration curve of the blade position vs. voltage is obtained. Hence the blade position can be determined, and typically, the half full-voltage is made to correspond to the laser beam center position vs. output voltage. In this manner, selected rotational positions of the table can be very accurately determined and calibrated.

The invention method also includes a method to calibrate the angular positions of the markers. Based on the symmetric property of angular position, namely, 1 revolution=360 degrees, ½ revolution=180 degrees (both halves should be equal), ¼ revolution is 90 degrees (all four quarters should be equal), etc. The subsystems described above are used to measure angular position changes of the table and to therefore place eight marker positions at 45 degree intervals around the table. Based on the rigid body theory, 16 equations can be derived and the true positions of the eight markers is determinate even with random table bearing runout.

Figure 2:
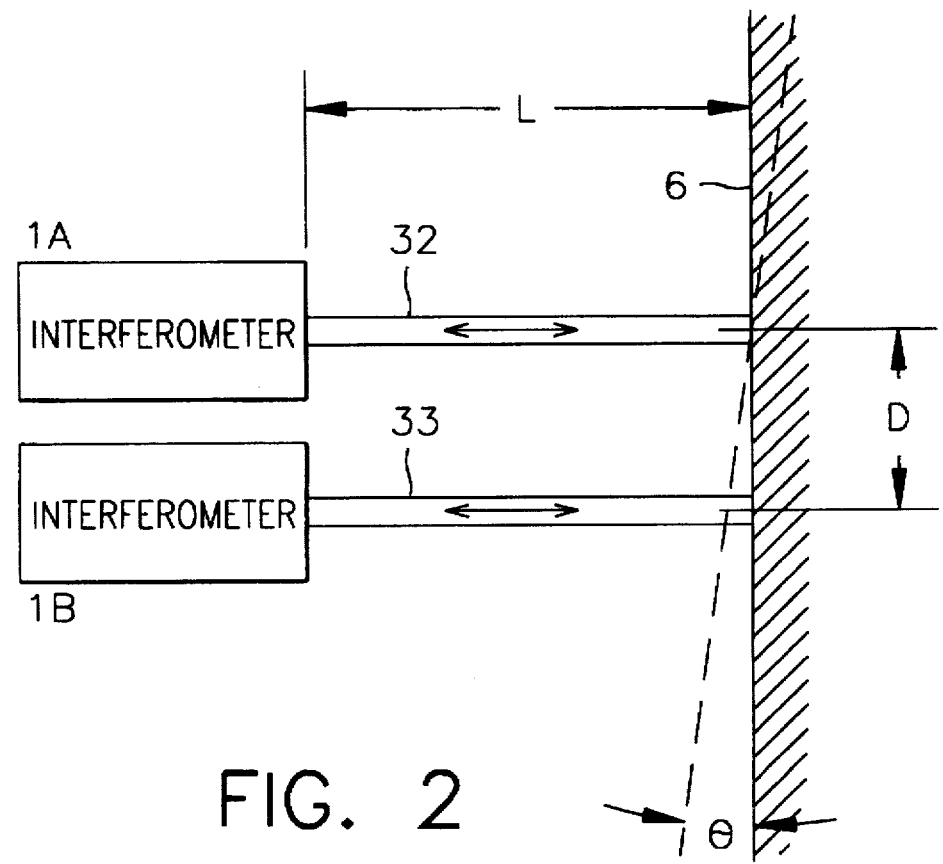
FIG. 2 is a plan view of the subject matter of FIG. 1 showing the placement of two LDDM instruments in side-by-side positions.

For a single-aperture LDDM instrument or a single-beam interferometer, with a large beam diameter, typically 5 to 10 mm, the return beam may be displaced laterally more than one-half the beam diameter, but the angular direction should be less than a few arcminutes from parallel. Hence, using two LDDM instruments or a differential interferometer to measure the angular change of the target 6, the maximum range is limited to less than a few arcminutes. Using the double-pass arrangement shown in FIG. 1, the maximum angular range $\phi$, is extended to $\phi=(d/2)/L$ where d is the beam diameter and L is the distance between the aperture of the LDDM instrument 1A or 1B and the target surface 6. For example, with d=5 mm, L=25 mm, $\phi$=5.7 degrees, since $\phi$ is not zero, the cosine correction is $1-\cos(\phi)$. The angular change $\Delta\theta$ of the flat mirror is:

$$\Delta\theta = \tan^{-1}[(\Delta L1 - \Delta L2)/D]$$

where $\Delta L1$ and $\Delta L2$ are respectively readings from LDDM instrument 1A and LDDM instrument 1B and are corrected for double pass and cosine angle, and D is the separation between the laser beams. Please refer to FIG. 1 and FIG. 2. The angular measurement here is insensitive to the linear movement of the target surface 6. To increase the range, multiple flat-mirrors are used. For example, with an angular range of 4 degrees, a polygon of 90 sides (90 flat-mirrors) could be used to increase the range to 360 degrees. Two sub-systems, separated by half the angle between adjacent mirrors, will cover the transition from one mirror to the next. The overlap reading is used to reduce the transition error to much less than the least resolution of the measurement.

Figure 4:
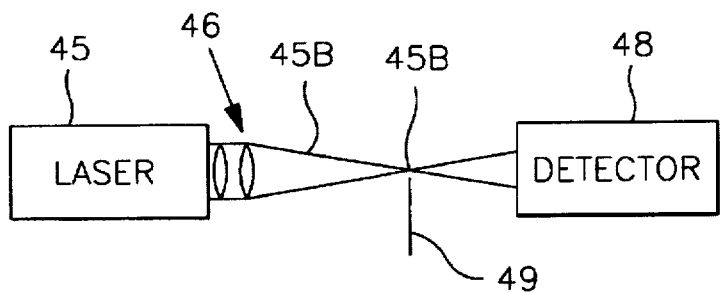
FIG. 4 demonstrates a method for very high precision position calibration.

Precision position markers are needed for the calibration of absolute table rotational angles. An electro-optical position sensor is shown in FIG. 4. Basically, a semiconductor diode laser 45 produces a beam 45A that is focused using focusing optics 46, to a small focal point 45B. A razor blade 49 moves with the table so as to break the beam 45A at the focal point 45B and a photodetector 48 is used to measure the intensity of the diode laser beam 45A. When the laser beam is unblocked, the output corresponds to full-voltage. When it is completely blocked by the razor blade 49, the output is zero. In other positions of razor blade 49 where the output is partially blocked, the intensity is proportional to the area of the laser beam 45A that is not blocked by the razor blade 49. Since the beam diameter at the focus can be made to be about 100 µm, with a stable diode laser and detector, a positioning repeatability of 0.1 µm is achieved. The system block diagram is shown in FIG. 3 where the subsystem 9 includes LDDM instruments 1A and 1B and processor module 11, while the subsystem 10 contains LDDM instruments 2A and 2B and processor module 12. The output of the two subsystems is fed to a computer 13. Eight razor blades are mounted on top of the polygon near the 45, 90, 135, 180, 225, 267, 315 and 360 degree locations. When the razor blade is at the center of the marker position (center of the focused diode laser beam), an electronic pulse is generated, read by the computer 13, and the angular readings of subsystem 9 and 10 at that instant are recorded.

Figure 5A:
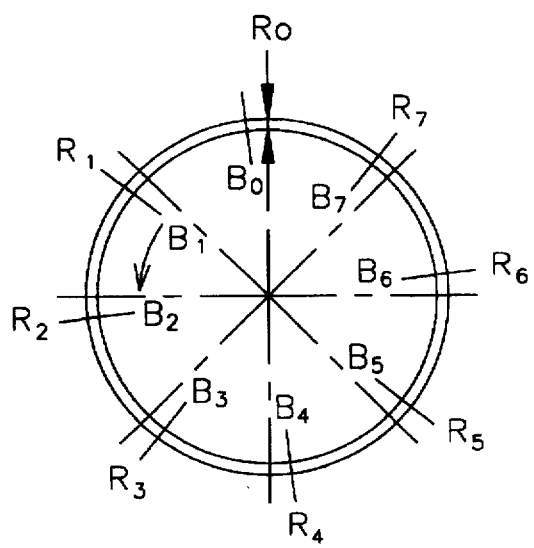
FIGS. 5A and 5B are schematic diagrams showing the rotational table in plan view at its initial rotational position, and after 90 degrees of rotation, and the positions Bn, n=0, 1, 2, . . . 7 are locations of the marker housing and razor blades respectively.
Figure 5B:
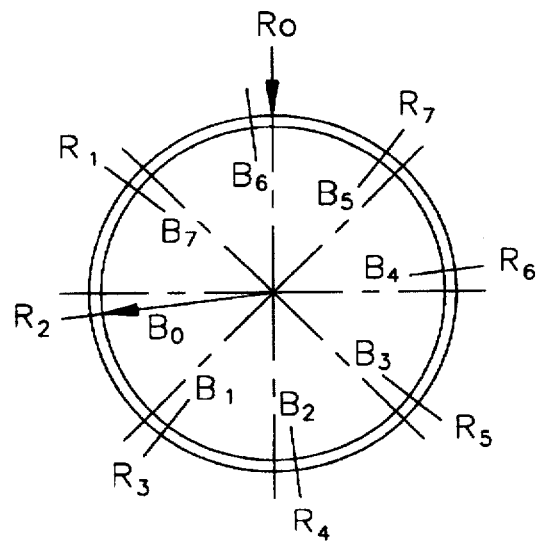

Let the location of the diode laser and detector be RN, N=0, 1, 2, ..., 7, and the location of the razor blades be BN, N=0, 1, 2, ..., 7, as shown in FIG. 5A. Initially, the marker positions are RN=BN, N=0, 1, 2, ..., 7. Rotating counter-clockwise 45 degrees, the LDDM instrument readings latched when the razor blade passes through the center of the diode laser beam are RN, N=0, 1, 2, ..., 7. Assume the bearing runout after 45 degrees rotation is $\Delta R$ at angle $\Psi$.

Let $\Delta x = \Delta R \cos \Psi$, $\Delta y = \Delta R \sin \Psi$, $\Delta x^1 = \Delta R \cos(\Psi - 45)$ and $\Delta y^1 = \Delta R \sin(\Psi - 45)$, we have R1=0) and $$RN = \Delta 1 + d3 + \Delta(N+1) - d(N+2) - \Delta N$$

$$N=0,2,3,\ldots,7; N \neq 1$$

where $\Delta N$ is the difference between the marker positions and the true 45 degree incremental positions, d1=$\Delta x$, d2=$\Delta x^1$, d3=$\Delta y$, d4=$\Delta y^1$, d5=$-\Delta x$, d6=$-\Delta x^1$, d7=$-\Delta y$ and d0=$-\Delta y^1$.

Next repeating the previous step, except rotating counter-clockwise 90 degree from the initial position, the LDDM instrument readings $R^1N$, n=0, 1, 2, 3, ..., 7 are $$R^1N = \Delta 2 + D3 + \Delta(N-2) - D(N+1) - \Delta N$$

$$N=0, 1, 3, 4, \ldots, 7; N \neq 2$$

$$R^1 2 = 0$$

where D1=$\Delta x$, D2=$\Delta x^1$, D3=$\Delta y$, D4=$\Delta^1$, D5=$-\Delta x$, D6=$-\Delta x^1$, D7=$-\Delta y$ and D0=$-\Delta y^1$. The runout after 90 degrees rotation is $\Delta R$ at angle $\Psi$, or $\Delta x = \Delta R \cos\Psi$, $\Delta y = \Delta R \sin\Psi$, $\Delta x^1 = \Delta R \cos(\Psi - 45)$ and $\Delta y^1 = \Delta R \sin(\Psi - 45)$.

There are 14 equations and 11 unknowns. Of those 14 equations, only 11 equations are independent. We can solve these equations to obtain $\Delta N$, N=1, 2, ..., 7, $\Delta x$, $\Delta y$, $\Delta x$ and $\Delta y$. Hence the eight markers' positions and the bearing runout can be calculated. It is noted that taking the average reading of 4 markers located at 90 degree increments, the runout $\Delta x$ and $\Delta y$ will cancel. Hence, true angular position can be obtained with no runout error.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An apparatus for providing data related to an angular rotation of a rotating table, the apparatus comprising:

light reflecting means including a plurality of mirrors placed end to end around a circumference of the rotating table thereby establishing a regular polygon of reflecting surfaces of the mirrors, such that the reflecting surfaces of the mirrors are tangent to a circumference of the table;

interferometric means for providing a plurality of parallel adjacent light beams directed at the light reflecting means, said beams spaced apart in such a manner that when one of said beams is positioned at an interface between two of the mirrors, another of said beams is positioned on only one of the mirrors;

a retroreflecting means positioned for receiving the light beams from the light reflecting means, and for redirecting the light beams back to the light reflecting means so as to direct the light beams back to the interferometric means;

whereby the interferometric means provides the data necessary to calculate the angular rotation of the rotating table.

2. The apparatus of claim 1 further including at least one angular position marker including a laser source with focusing optics, a photodetector positioned for receiving a laser beam from the laser source, and at least one razor blade mounted on the table in a position for breaking the laser beam when the table is at a position where the at least one razor blade is brought between the laser source and the photodetector.

3. The apparatus of claim 2 wherein the at least one position marker includes a plurality of the position markers spaced apart at a regular angular interval and further the at least one razor blade includes a plurality of the razor blades spaced apart at the same regular angular interval as is the position markers.

4. A method for providing data related to the rotation of a rotating table, the method comprising the steps:

a) providing light reflecting means as a polygon of planar reflectors circumscribing a circumference of the rotating table;

b) projecting a plurality of parallel adjacent light beams from an interferometric means, at the light reflecting means;

c) receiving the light beams from the light reflecting means at a retroreflecting means;

d) redirecting the light beams back to the light reflecting means so as to direct the light beams back to the interferometric means;

whereby the method provides the data necessary to calculate the angular rotation of the rotating table.

5. A method for providing data related to the rotation of a rotating table, the method comprising the steps:

a) providing light reflecting means as a polygon of planar reflectors circumscribing a circumference of the rotating table;

b) projecting a plurality of parallel adjacent light beams from an interferometric means, at the light reflecting means;

c) receiving the light beams from the light reflecting means;

d) redirecting the light beams back to the light reflecting means so as to direct the light beams back to the interferometric means;

e) directing a laser beam means from a laser source means to a photodetector means;

f) positioning a razor blade means on the rotating table so as to intercept the laser beam means when the rotating table is at selected rotational positions;

whereby the method provides the data necessary to calculate the error of rotation of the rotating table.

6. An apparatus for providing data related to the angular rotation of a body, the apparatus comprising:

light reflecting means fixed to the body so as to move with the body;

interferometric means for providing a plurality of parallel adjacent light beams directed at the light reflecting means;

a retroreflecting means positioned for receiving the light beams from the light reflecting means, and for redirecting the light beams back to the light reflecting means so as to direct the light beams back to the interferometric means;

whereby the interferometric means provides the data necessary to calculate the angular rotation of the body.

7. The apparatus of claim 6 further including an angular position marker including a laser source with focusing optics, a photodetector positioned for receiving a laser beam from the laser source, and a razor blade mounted on the body in a position for breaking the laser beam when the body is at a position where the razor blade is brought between the laser source and the photodetector.

8. A method for providing data related to the rotation of a body, the method comprising the steps:

a) providing light reflecting means fixed to the body and movable therewith;

b) projecting a plurality of parallel adjacent light beams from an interferometric means, at the light reflecting means;

c) receiving the light beams from the light reflecting means at a retroreflector means;

d) redirecting the light beams back to the light reflecting means so as to direct the light beams back to the interferometric means;

whereby the method provides the data necessary to calculate the angular rotation of the body.

9. The method of claim 8 further including the steps of:

e) directing a laser beam means from a laser source means to a photodetector means;

f) positioning a razor blade means on the body so as to intercept the laser beam means when the body is at selected rotational positions.

* * * * *